United States Patent
Rasmussen

(10) Patent No.: US 7,801,255 B2
(45) Date of Patent: *Sep. 21, 2010

(54) SYNCHRONIZATION TECHNIQUE FOR SERIAL MODULATED WAVEFORMS

(75) Inventor: Donald John Rasmussen, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1308 days.

This patent is subject to a terminal disclaimer.

(21) Appl. No.: 11/314,608

(22) Filed: Dec. 21, 2005

(65) Prior Publication Data

US 2007/0025477 A1    Feb. 1, 2007

Related U.S. Application Data

(60) Provisional application No. 60/703,320, filed on Jul. 28, 2005.

(51) Int. Cl.
H04L 27/06 (2006.01)

(52) U.S. Cl. .................................................. 375/343

(58) Field of Classification Search .............. 375/316, 375/340, 343, 322, 324, 336, 366, 365, 362, 375/354, 367, 368, 259, 271, 272, 274, 279, 375/280, 281, 130, 140, 147, 152; 708/1, 708/3, 5, 100, 200, 422–426, 800, 801, 813; 455/39, 59, 60, 205–209, 42
See application file for complete search history.

(56) References Cited

U.S. PATENT DOCUMENTS

| | | | |
|---|---|---|---|
| 3,938,045 | A | 2/1976 | Mathwich |
| 4,057,759 | A | 11/1977 | Genova et al. |
| 4,516,087 | A | 5/1985 | Bruene |
| 4,621,365 | A | * 11/1986 | Chiu ........................ 375/149 |
| 4,680,777 | A | * 7/1987 | Saha ........................ 375/280 |
| 4,980,767 | A | * 12/1990 | Chao et al. ................ 348/613 |
| 5,157,693 | A | 10/1992 | Lemersal, Jr. et al. |
| 5,177,765 | A | 1/1993 | Holland et al. |

(Continued)

FOREIGN PATENT DOCUMENTS

DE    102 49 413 A1    5/2004

(Continued)

OTHER PUBLICATIONS

Donald J. Rasmussen et al.; "Serial Demodulation of an OQPSK Direct Sequence Spread Signal", IEEE, 1992 pp. 171-179.

(Continued)

Primary Examiner—David C Payne
Assistant Examiner—Vineeta S Panwalkar
(74) Attorney, Agent, or Firm—RatnerPrestia

(57) ABSTRACT

Methods and apparatus for synchronization (SYNC) detection of a received serial offset quadrature pulse shaped waveform modulated by a symbol SYNC sequence are provided. The waveform is serially demodulated into a serial baseband signal and serially correlated with segments of the symbol SYNC sequence. Correlation strength estimates of each of the serially correlated output signal are computed and combined to detect a coarse SYNC. The serially correlated output signals are phase corrected based upon phase change conditions and the phase corrected signals are used to detect a fine SYNC.

20 Claims, 16 Drawing Sheets

U.S. PATENT DOCUMENTS

| | | | |
|---|---|---|---|
| 5,195,108 A | | 3/1993 | Baum et al. |
| 5,373,536 A | * | 12/1994 | Dehner et al. ............... 375/354 |
| 5,579,338 A | | 11/1996 | Kojima |
| 5,732,106 A | | 3/1998 | Rasmussen et al. |
| 5,818,867 A | | 10/1998 | Rasmussen |
| 6,002,710 A | | 12/1999 | Hendrickson et al. |
| 6,125,135 A | * | 9/2000 | Woo et al. .................. 375/130 |
| 6,674,790 B1 | | 1/2004 | Rasmussen et al. |
| 6,859,463 B1 | | 2/2005 | Mayor et al. |
| 2001/0002919 A1 | * | 6/2001 | Sourour et al. ............. 375/150 |
| 2003/0043947 A1 | * | 3/2003 | Zehavi et al. ............... 375/365 |
| 2003/0138031 A1 | * | 7/2003 | Okubo et al. ............... 375/144 |

FOREIGN PATENT DOCUMENTS

| | | |
|---|---|---|
| GB | 2 359 456 A | 8/2001 |
| WO | WO 01/10070 A1 | 2/2001 |

OTHER PUBLICATIONS

International Search Report—Appln. No. PCT/US2006/029824 Filed Jul. 28, 2006.

Carl Andren, "Short PN Sequences for Direct Sequences Spread Spectrum Radios", Apr. 11, 1997, pp. 1-4.

John Fakatselis, "Processing Gain for Direct Sequence Spread Spectrum Communication Systems and PRISM®", Intersil Corporation, 2000, pp. 1-4.

Chris Heegard et al., "High-Performance Wireless Ethernet", IEEE, Nov. 2001, pp. 64-73.

* cited by examiner

SYNCHRONIZATION TECHNIQUE FOR SERIAL MODULATED WAVEFORMS

CROSS REFERENCE TO RELATED APPLICATIONS

This application claims priority of U.S. Provisional Patent Application Ser. No. 60/703,320, filed Jul. 28, 2005.

STATEMENT REGARDING FEDERALLY SPONSORED RESEARCH

This invention was made with Government Support Under Agreement No. DAAB07-03-9-K601 awarded by the United States Army. The Government has certain rights in the invention.

FIELD OF THE INVENTION

The present invention relates to the field of communication systems. More specifically, the present invention relates to methods and apparatus for synchronization detection of a serial offset quadrature pulse shaped (such as phase shift keyed (PSK)) signal in a receiver.

SUMMARY OF THE INVENTION

The present invention is embodied in a method for synchronization (SYNC) detection of a received serial offset quadrature pulse shaped waveform modulated by a predetermined SYNC sequence of symbols. The method serially demodulates the received waveform into a serial baseband signal. The serial baseband signal has the same predetermined SYNC sequence of symbols. The method also correlates the serial baseband signal with a plurality of segments of the SYNC sequence of symbols to form a plurality of serially correlated output signals. The plurality of segments form the predetermined SYNC sequence of symbols. The method further computes correlation strength estimates of each of the serially correlated output signals. The method further combines the correlation strength estimates to form a combined correlation signal and detects SYNC using the combined correlation signal.

The present invention is also embodied in a method for synchronization (SYNC) detection of a received serial offset quadrature pulse shaped waveform modulated by a predetermined SYNC sequence of symbols. The method serially demodulates the received waveform into a serial baseband signal. The serial baseband signal has the same predetermined SYNC sequence of symbols. The method also correlates the serial baseband signal with a plurality of segments of the SYNC sequence of symbols to form a plurality of serially correlated output signals. The plurality of segments form the predetermined SYNC sequence of symbols. The method further phase corrects the serially correlated output signals based upon predetermined phase change conditions and detects SYNC using the phase corrected serially correlated output signals.

The present invention is further embodied in a receiver. The receiver includes a demodulator for serially demodulating a received waveform into a serial baseband signal. The serial baseband signal has a predetermined synchronization (SYNC) sequence of symbols. The receiver further includes a matched filter for correlating the serial baseband signal with a plurality of segments of the SYNC sequence of symbols to form a plurality of serially correlated output signals. The plurality of segments form the predetermined SYNC sequence of symbols.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

An embodiment of the present invention uses a serial quasi-bandlimited-minimum shift keyed (SQBL-MSK) signal as a modulation waveform. The SQBL-MSK enables a serial correlation structure to be used, with an in-phase (I) and quadrature (Q) correlator using the same synchronization (SYNC) sequence. Standard parallel QBL-MSK typically uses a four correlator structure based on the even and odd symbols on the I and Q sequence. The serial correlation structure used for synchronization (SYNC) detection and short segment correlations for frequency estimation provides a simplified binary phase shift keyed (BPSK) correlation operation versus the parallel structure, which reduces the complexity in the SYNC and frequency estimation operation.

Although QBL-MSK is selected as the modulation waveform, it is contemplated that other constant or near constant envelope modulation such as Offset Quadrature Phase Shift Keying (OQPSK), Minimum Shift Keying (MSK), Gaussian MSK, Tamed Frequency Modulation (TFM), Intersymbol Jitter Free Offset Quadrature Phase Shift Keying (IJF-OQPSK), Raised Cosine Filtered Offset Quadrature Phase Shift Keying (RC-OQPSK), and bandwidth efficient Continuous Phase Modulation (CPM) methods may be used for the modulation. Non constant envelope modulation waveforms, such as BPSK and filtered BPSK, may also be used for the modulation.

To simplify the SYNC and frequency estimation operation, it is desirable to implement serial formatting on these waveforms. Serial formatting for offset quadrature pulse-shaped signals may be applied by adding a serial formatting term to the modulation waveform, which multiplies the nonreturn to zero (NRZ) symbol sequence with a repetitive 1, 1, −1, −1 sequence. For SQBL-MSK, the modulation waveform for the SYNC portion of the waveform can be written as follows:

$$s(t) = \left[\sum_{i=0}^{M-1} (-1)^i c_{2i} \cdot p(t - 2iT_s)\right]\cos(2\pi f_o t) + \quad \text{(eqn 1)}$$

$$\left[\sum_{i=0}^{M-1} (-1)^i c_{2i+1} \cdot p(t - [2i+1]T_s)\right]\sin(2\pi f_o t)$$

and $$p(t) = \begin{cases} \left[\dfrac{\sin\left(\dfrac{\pi t}{2T_s}\right)}{\left(\dfrac{\pi t}{2T_s}\right)}\right]^3; & -2T_s \le t \le 2T_s \\ 0; & \text{elsewhere.} \end{cases} \quad \text{(eqn 2)}$$

For the data modulated SQBL-MSK waveform equation given above, $T_s$ represents the symbol period, $c_i$ represents the SYNC symbols at time $iT_s$, 2M is the number of symbols in the SYNC sequence, p(t) is the QBL pulse-shaping function, $f_o$ is the carrier center frequency, and the $(-1)^i$ terms which multiplies the symbol value represents the serial formatting. For 128 symbol SYNC, for example, M is equal to 64. The SYNC symbols ($c_i$) take on either a+1 or −1 value.

Figure 1:
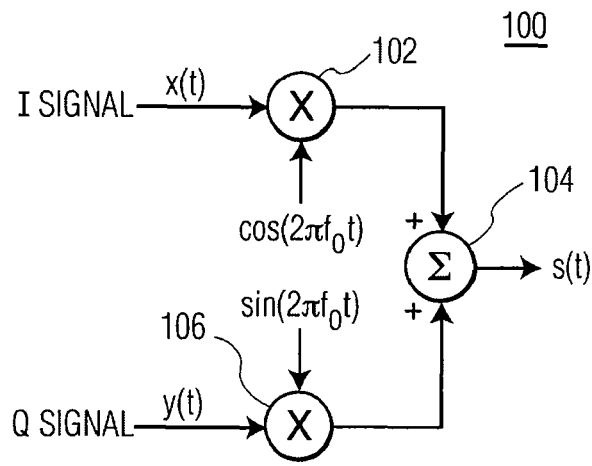
FIG. 1 is a block diagram of a SQBL-MSK modulator, in accordance with an embodiment of the present invention.

FIG. 1 shows a block diagram of SQBL-MSK modulator 100 having I {x(t)} and Q {y(t)} as input signals. As shown in FIG. 1, the I and Q data signals are mixed with a carrier signal at mixers 102 and 106. The outputs are then combined at summer 104. It is understood that a summer may add signals or take the difference between signals. The resulting signal s(t) is the modulation waveform. The equations for the I {x(t)} and Q {y(t)} signals modulating the carrier during the SYNC portion of the waveform are obtained from equation 1, as follows:

$$x(t) = \left[\sum_{i=0}^{M-1} (-1)^i c_{2i} \cdot p(t - 2iT_s)\right] \quad \text{(eqn 3)}$$

and $$y(t) = \left[\sum_{i=0}^{M-1} (-1)^i c_{2i+1} \cdot p(t - [2i+1]T_s)\right]. \quad \text{(eqn 4)}$$

Figure 2:
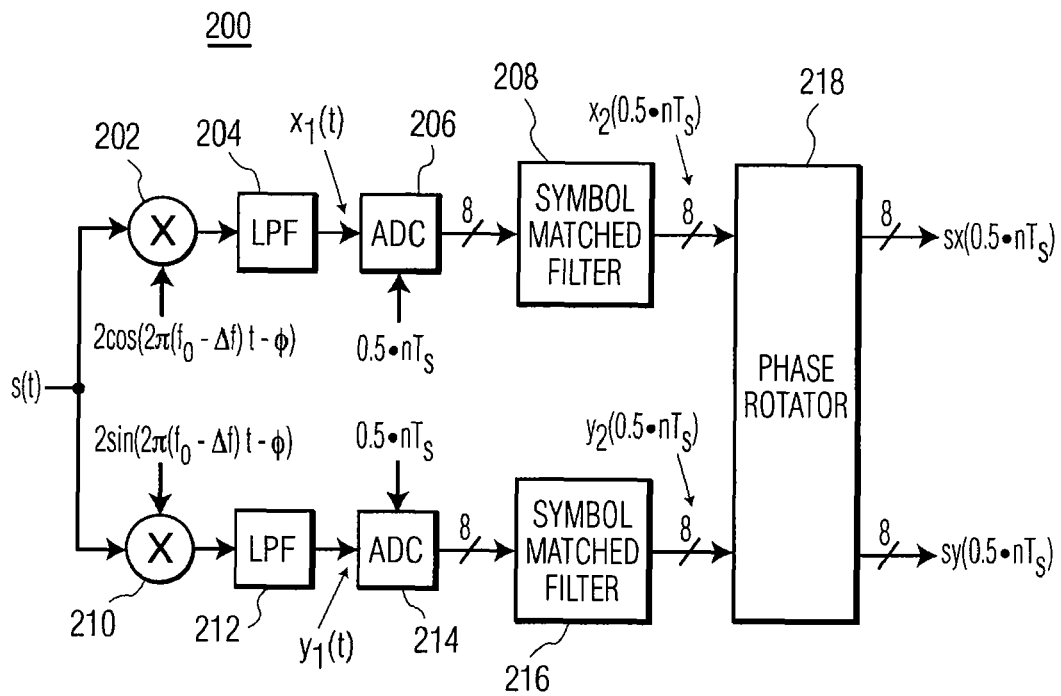
FIG. 2 is a block diagram of a SQBL-MSK demodulator front end, in accordance with an embodiment of the present invention.

FIG. 2 shows a block diagram of a SQBL-MSK demodulator front-end of receiver 200, which down-converts the received signal to baseband I and Q signals, digitizes the I and Q signals, and digitally filters the I and Q signals with the respective symbol matched filters. As shown in FIG. 2, the received signal is mixed by mixers 202 and 210 with respective quadrature signals at the carrier frequency, resulting in the desired baseband I and Q signals (mixing difference term) and the undesired signal at twice the carrier frequency (mixing sum term). Lowpass filtering by LPF 204 and LPF 212 follows the down-converter function to remove the undesired mixing summation term. Baseband I and Q signals are digitized by the I and Q analog-to-digital converters (ADC) 206 and 214, respectively. As shown in FIG. 2, the sampling rate is equal to twice the symbol rate.

Following digitization, the I and Q signals are filtered by respective symbol matched filters 208 and 216, which maximizes the signal-to-noise ratio (SNR). Phase rotator 218 converts the I and Q symbol matched filter outputs into serial I and Q signals, which are sent to the SYNC detection operation and demodulation section (described later).

The QBL-MSK symbol matched filter coefficients are based on the QBL-MSK pulse-shaping function defined by:

$$p(t) = \begin{cases} \left[\dfrac{\sin\left(\dfrac{\pi[t-2T_s]}{2T_s}\right)}{\left(\dfrac{\pi[t-2T_s]}{2T_s}\right)}\right]^3; & 0 \le t \le 4T_s \\ 0; & \text{elsewhere.} \end{cases} \quad \text{(eqn 5)}$$

where $T_s$ corresponds to the symbol period for the SYNC sequence.

Because the QBL-MSK pulse-shaping function is non-zero over a four symbol period interval, the digital QBL-MSK symbol matched filter operating at twice the symbol rate may include 9 samples defined by the following equation:

$$p(k) = \left[\frac{\sin\left(\frac{\pi[0.5 \cdot k - 2]}{2}\right)}{\left(\frac{\pi[0.5 \cdot k - 2]}{2}\right)}\right]^3 ; \quad k = 0, 1, 2, 3, \ldots 8. \quad \text{(eqn 6)}$$

Recognizing that the filter value for k equal to 0 and 8 are equal to zero, the digital QBL-MSK symbol matched filter response may be simplified to 7 samples defined by the following equation:

$$p(k) = \left[\frac{\sin\left(\frac{\pi[0.5 \cdot k - 1.5]}{2}\right)}{\left(\frac{\pi[0.5 \cdot k - 1.5]}{2}\right)}\right]^3 ; \quad k = 0, 1, 2, 3, \ldots 6. \quad \text{(eqn 7)}$$

Figure 3:
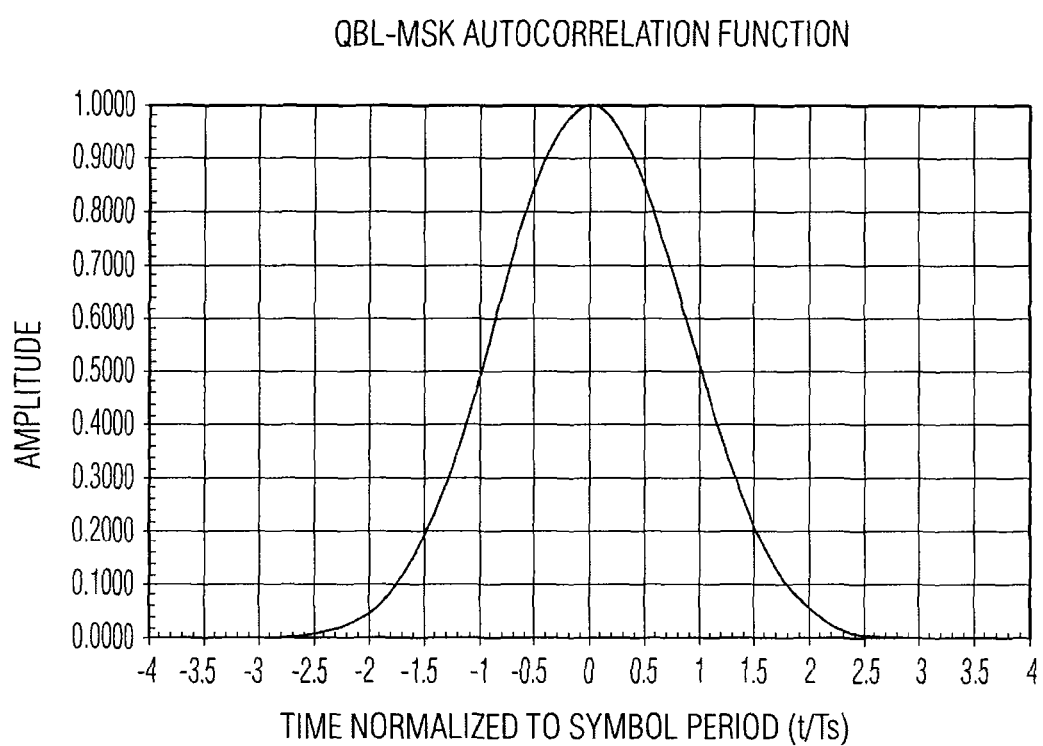
FIG. 3 is a plot of a QBL-MSK autocorrelation function, in accordance with an embodiment of the present invention.

Convolution of the QBL-MSK symbol pulse shape with the QBL-MSK symbol matched filter results in the QBL-MSK autocorrelation function $\{g(t)\}$. FIG. 3 shows a plot of the QBL-MSK autocorrelation function $\{g(t)\}$. As shown in this figure, the autocorrelation function is zero for time $2.5\,T_s$ from a desired optimum sampling point (time t=0).

Using the QBL-MSK autocorrelation function $\{g(t)\}$, the I and Q output signals from the symbol matched filters (based on equation 3 and 4) are:

$$x_2(0.5\,nT_s) = \left[\sum_{i=0}^{M-1}(-1)^i c_{2i} \cdot g(0.5\,nT_s - 2iT_s)\right] \quad \text{(eqn 8)}$$
$$\cos(\pi n\Delta f T_s + \phi) + \left[\sum_{i=0}^{M-1}(-1)^i c_{2i+1} \cdot g(0.5\,nT_s - [2i+1]T_s)\right]$$
$$\sin(\pi n\Delta f T_s + \phi)$$

and $$y_2(0.5\,nT_s) = -\left[\sum_{i=0}^{M-1}(-1)^i c_{2i} \cdot g(0.5\,nT_s - 2iT_s)\right] \quad \text{(eqn 9)}$$
$$\sin(\pi n\Delta f T_s + \phi) + \left[\sum_{i=0}^{M-1}(-1)^i c_{2i+1} \cdot g(0.5\,nT_s - [2i+1]T_s)\right]$$
$$\cos(\pi n\Delta f T_s + \phi);$$

where $\Delta f$ is the carrier frequency error and $\phi$ is the carrier phase change.

Phase rotator 218 enables the SQBL-MSK modulated signal to be serially demodulated, thus allowing the SYNC I and Q correlation operations to operate against the same SYNC symbol sequence versus having to separate the SYNC symbol sequence into even and odd chips, as required by a parallel correlator. The two sample per symbol I and Q signals out of phase rotator 218 are sent to a SYNC detection module (FIG. 6) which determines the timing control for selecting the proper sample and performs an adaptive SYNC threshold process based on correlation segments of the SYNC sequence (using the four magnitude outputs of the magnitude detectors 902 in FIG. 9).

Figure 4:
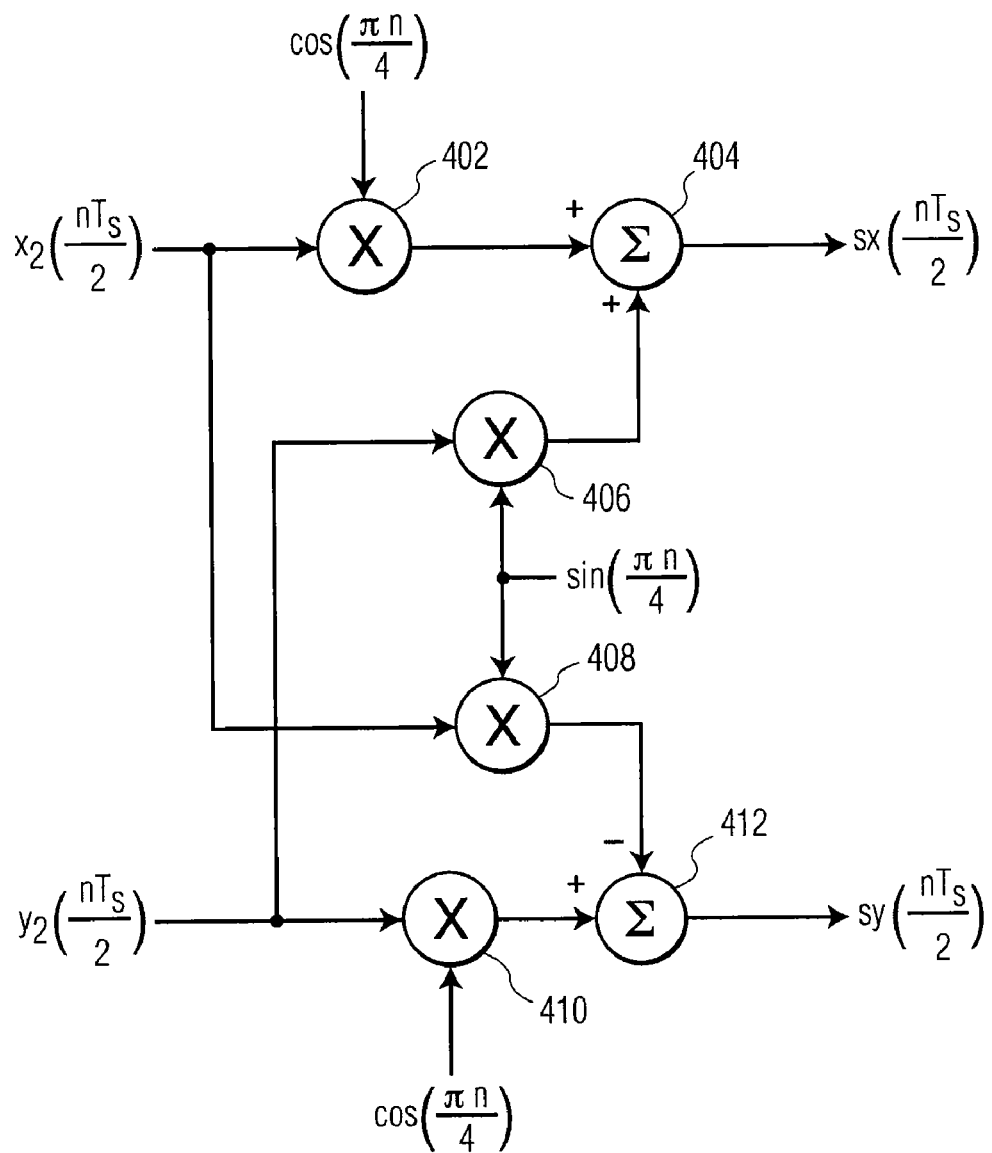
FIG. 4 is a block diagram of a phase rotator, in accordance with an embodiment of the present invention.
Figure 5:
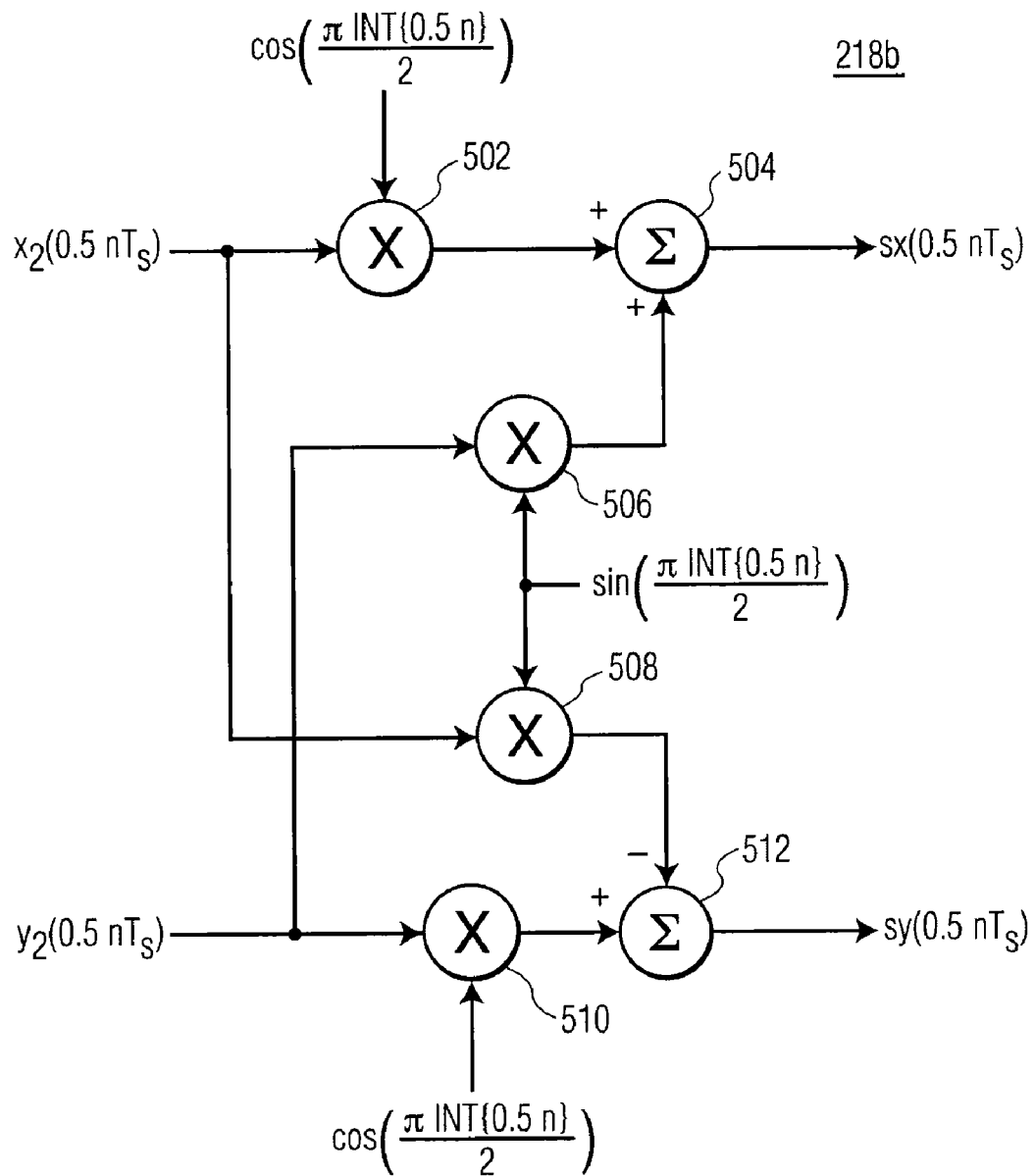
FIG. 5 is a block diagram of another phase rotator, in accordance with an embodiment of the present invention.

Phase rotator 218 can be implemented by a first phase rotator 218a shown in FIG. 4 or a more simplified phase rotator 218b shown in FIG. 5. The simplified phase rotator offers a lower complexity. Either phase rotator 218a or 218b may be used to implement the serial demodulation of the present invention.

FIG. 4 shows first phase rotator 218a for implementing the serial demodulation. As shown, the I and Q symbol matched filter outputs, represented by $x_2(nT_s/2)$ and $y_2(nT_s/2)$, enter phase rotator 218a to be mixed with a $\cos(\pi n/4)$ signal by respective mixers 402 and 410 and a $\sin(\pi n/4)$ signal at mixers 406 and 408. The outputs from mixers 402 and 406 are combined by summer 404 and the outputs from mixers 408 and 410 are combined by summer 412 (actually subtractor 412).

FIG. 5 shows simplified phase rotator 218b for implementing the serial demodulation. As shown, the I and Q symbol matched filter outputs, represented by $x_2(nT_s/2)$ and $y_2(nT_s/2)$, enter phase rotator 218b to be mixed with a $\cos[\pi\mathrm{INT}(0.5\,n)/2]$ signal by respective mixers 502 and 510 and a $\sin[\pi\mathrm{INT}(0.5\,n)/2]$ signal at mixers 506 and 508, where INT represents a function that takes the integer number of its argument. The outputs from mixers 502 and 506 are combined by summer 504 and the outputs from mixers 508 and 510 are combined by summer 512 (actually subtractor 512).

The serial I and Q signals outputted from first phase rotator 218a (FIG. 4) are given by the following equations:

$$sx(0.5\,nT_s) = x_2(0.5\,nT_s + \Delta T_s) \cdot \cos\left(\frac{\pi n}{4} + \theta\right) + \quad \text{(eqn 10)}$$
$$y_2(0.5\,nT_s + \Delta T_s) \cdot \sin\left(\frac{\pi n}{4} + \theta\right)$$

and $$sy(0.5\,nT_s) = -x_2(0.5\,nT_s + \Delta T_s) \cdot \sin\left(\frac{\pi n}{4} + \theta\right) + \quad \text{(eqn 11)}$$
$$y_2(0.5\,nT_s + \Delta T_s) \cdot \cos\left(\frac{\pi n}{4} + \theta\right);$$

where $\Delta T_s$ is the timing error ($\pm T_s/4$ maximum) not removed by the SYNC timing correction and $\theta$ represents one of four possible timing conditions the phase rotator may have depending on timing error. The phase associated with the phase rotator is equal to either $-90$, 0, 90 or 180 degrees.

The second, simplified phase rotator 218b (FIG. 5) may be selected based upon simplification of the mathematical equations. Simplified phase rotator 218b may introduce an additional phase change of $-45$ degrees every other sample.

Results derived from using the first phase rotator 218a (FIG. 4) directly apply to simplified phase rotator 218b. Inserting the equations for $x_2(nT_s)$ and $y_2(nT_s)$ and applying simplifications to these equations provides the following equations:

$$sx(0.5\,nT_s) = \left[\sum_{i=0}^{2M-1} c_i \cdot \right. \quad \text{(eqn 12)}$$
$$g([0.5\,nT_s] + \Delta T_s] - iT_s) \cdot \cos\left(\frac{\pi[0.5\,nT_s - iT_s]}{2T_s}\right)\right]$$
$$\cos(2\pi[0.5\,n\Delta f T_s] + \theta_c) - \left[\sum_{i=0}^{M-1} c_i \cdot g([0.5\,nT_s + \Delta T_s] - iT_s) \cdot \right.$$
$$\left.\sin\left(\frac{\pi[0.5\,nT_s - iT_s]}{2T_s}\right)\right]\sin(2\pi[0.5\,n\Delta f T_s] + \theta_c)$$

and

-continued $$sy(0.5nT_s) = -\left[\sum_{i=0}^{2M-1} c_i \cdot g([0.5nT_s + \Delta T_s] - iT_s) \cdot \cos\left(\frac{\pi[0.5nT_s - iT_s]}{2T_s}\right)\right] \quad \text{(eqn 13)}$$

$$\sin(2\pi[0.5n\Delta fT_s] + \theta_c) - \left[\sum_{i=0}^{M-1} c_i \cdot g([0.5nT_s + \Delta T_s] - iT_s) \cdot \sin\left(\frac{\pi[0.5nT_s - iT_s]}{2T_s}\right)\right] \cos(2\pi[0.5n\Delta fT_s] + \theta_c)$$

where $$\theta_c = \theta + \phi. \quad \text{(eqn 14)}$$

The phase error introduced by the down-conversion operation ($\phi$) and the phase error introduced by the phase rotator ($\theta$) can be combined into a total carrier phase error term ($\theta_c$). From these equations, two key features of serial demodulation can be seen. First, the serial formatting factor $(-1)^i$ seen in the modulation equation (eqn 1) can be removed. Secondly, it can be seen that the I and Q baseband signals consist of the filtered SYNC sequence multiplied by either a cosine or a sine weighting function. From FIG. 3, the QBL-MSK autocorrelation function is nonzero for ±2.5 $T_s$ about the ideal SYNC time of zero. Because the cosine weighting function forces the QBL-MSK autocorrelation function to zero at times $-T_s + \Delta T_s$ and $T_s + \Delta T_s$ only the QBL-MSK terms at $-2T_s + \Delta T_s$, $\Delta T_s$ and $2T_s + \Delta T_s$ need to be considered for each cosine weighted QBL-MSK autocorrelation symbol response.

Similarly the sine weighting function forces the QBL-MSK autocorrelation function to zero at times $-2T_s + \Delta T_s$, $\Delta T_s$, and $2T_s + \Delta T_s$, so only the QBL-MSK terms at $T_s + \Delta T_s$ and $T_s + \Delta T_s$ need to be considered for each sine weighted QBL-MSK autocorrelation symbol response.

Using this information and the optimal symbol sample time, the equations for the serial I and Q signal can be rewritten as follows:

$$sx(nT_s) = \quad \text{(eqn 15)}$$
$$\sum_{i=0}^{2M-1} c_i \cdot \{g(\Delta T_s)\delta(n-i) \cdot \cos(2\pi n\Delta fT_s + \theta_c) - g(-2T_s + \Delta T_s)$$
$$\delta(n+2-i) \cdot \cos(2\pi[n+2]\Delta fT_s + \theta_c) - g(2T_s + \Delta T_s)$$
$$\delta(n-2-i) \cdot \cos(2\pi[n-2]\Delta fT_s + \theta_c)\} - \left[\sum_{i=0}^{2M-1} c_i \cdot \right.$$
$$\{-g(-T_s + \Delta T_s)\delta(n+1-i) \cdot \sin(2\pi[n+1]\Delta fT_s + \theta_c) +$$
$$\left. g(T_s + \Delta T_s)\delta(n-1-i) \cdot \sin(2\pi[n-1]\Delta fT_s + \theta_c)\}\right]$$

and $$sy(nT_s) = \quad \text{(eqn 16)}$$
$$-\left[\sum_{i=0}^{2M-1} c_i \cdot \{g(\Delta T_s)\delta(n-i) \cdot \sin(2\pi n\Delta fT_s + \theta_c) - g(-2T_s + \Delta T_s)\right.$$
$$\delta(n+2-i) \cdot \sin(2\pi[n+2]\Delta fT_s + \theta_c) -$$
$$g(2T_s + \Delta T_s)\delta(n-2-i) \cdot$$
$$\left.\sin(2\pi[n-2]\Delta fT_s + \theta_c)\}\right] - \left[\sum_{i=0}^{2M-1} c_i \cdot \right.$$
$$\{-g(-T_s + \Delta T_s)\delta(n+1-i) \cdot \cos(2\pi[n+1]\Delta fT_s + \theta_c) +$$
$$\left. g(T_s + \Delta T_s)\delta(n-1-i) \cdot \cos(2\pi[n-1]\Delta fT_s + \theta_c)\}\right];$$

where $\delta(n)$ is the unit impulse function, which is equal to 1 for n equal to zero and equal to 0 for all other values of n. The serial I and Q signals can be rewritten as follows:

$$sx(nT_s) = \quad \text{(eqn 17)}$$
$$\sum_{i=0}^{2M-1} [c_i \cdot \alpha_0 - c_{i+2} \cdot \alpha_2 - c_{i-2} \cdot \alpha_2]\delta(n-i)\cos(2\pi n\Delta fT_s + \theta_c) -$$
$$\sum_{i=0}^{2M-1} [-c_{i+1} \cdot \alpha_{-1} + c_{i-1} \cdot \alpha_1]\delta(n-i)\sin(2\pi n\Delta fT_s + \theta_c)$$

and $$sy(nT_s) = -\sum_{i=0}^{2M-1} [c_i \cdot \alpha_0 - c_{i+2} \cdot \alpha_{-2} - c_{i-2} \cdot \alpha_2] \quad \text{(eqn 18)}$$
$$\delta(n-i)\sin(2\pi n\Delta fT_s + \theta_c) -$$
$$\sum_{i=0}^{2M-1} [-c_{i+1} \cdot \alpha_{-1} + c_{i-1} \cdot \alpha_1]\delta(n-i)\cos(2\pi n\Delta fT_s + \theta_c);$$

where $$\alpha_n = g(nT_s + \Delta T_s). \quad \text{(eqn 19)}$$

From these equations, it may be seen that the serial I and Q signals consist of a desired SYNC sequence multiplied by the sinusoidal carrier frequency error term and an undesired cross-correlation property of the SYNC sequence.

For SYNC sequences with low cross-correlation property over the correlation segments, these cross-correlation terms are typically negligible. Removing these terms from the serial I and Q signals results in the following equations:

$$sx_a(nT_s) = \sum_{i=0}^{2M-1} [c_i \cdot \alpha_0]\delta(n-i)\cos(2\pi n\Delta fT_s + \theta_c) \quad \text{(eqn 20)}$$
$$= \sum_{i=0}^{2M-1} [c_i \cdot g(\Delta T_s)]\delta(n-i)\cos(2\pi n\Delta fT_s + \theta_c)$$

and $$sy_a(nT_s) = -\sum_{i=0}^{2M-1} [c_i \cdot \alpha_0]\delta(n-i)\sin(2\pi n\Delta fT_s + \theta_c) \quad \text{(eqn 21)}$$
$$= -\sum_{i=0}^{2M-1} [c_i \cdot g(\Delta T_s)]\delta(n-i)\sin(2\pi n\Delta fT_s + \theta_c).$$

Performing the same simplification operations with the other symbol sample time results in the equations for the serial I and Q signals at the other sampling time:

$$sx_a(nT_s + 0.5) = \qquad (\text{eqn 22})$$
$$\sum_{i=0}^{2M-1} [c_i \cdot g(0.5T_s + \Delta T_s)]\delta(n-i)\cos(2\pi n\Delta f T_s + \pi\Delta f T_s + \theta_c)$$

and $$sy_a(nT_s + 0.5) = \qquad (\text{eqn 23})$$
$$-\sum_{i=0}^{2M-1} [c_i \cdot g(0.5T_s + \Delta T_s)]\delta(n-i)\sin(2\pi n\Delta f T_s + \pi\Delta f T_s + \theta_c).$$

Figure 6:
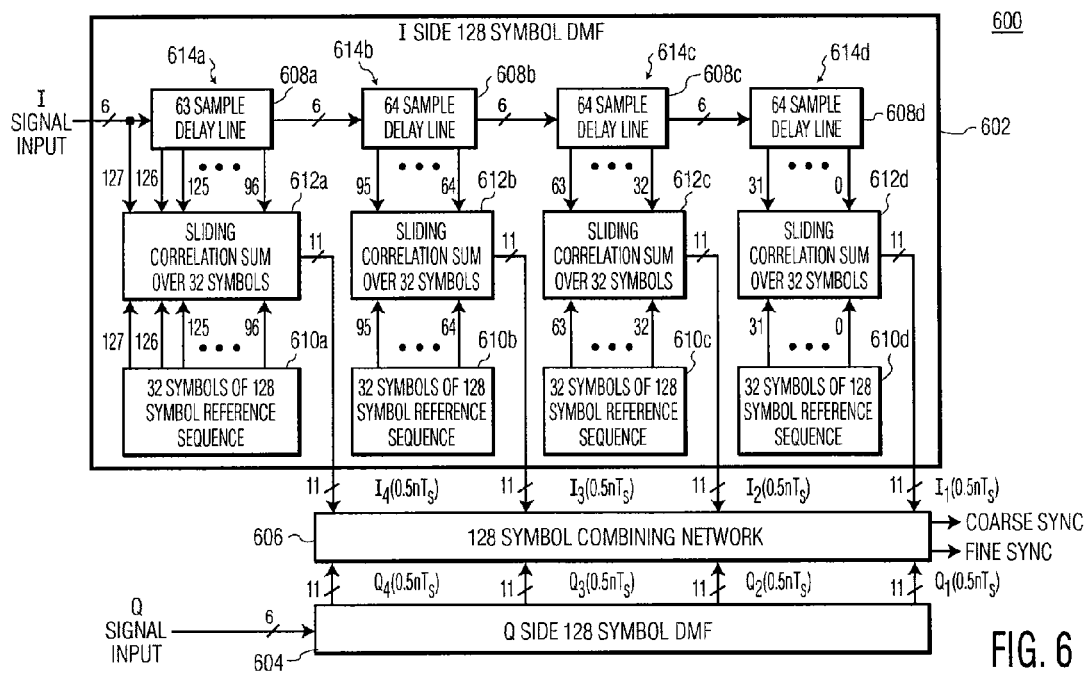
FIG. 6 is a block diagram of a SYNC detection structure with carrier frequency correction, in accordance with an embodiment of the present invention.

FIG. 6 shows SYNC detection module 600 which performs SYNC detection with carrier frequency correction, using the simplified (based on SYNC sequence assumptions given above) serial I and Q samples, shown in equations 20 to 23. The serial I and Q signals are sent to respective digital matched filters (DMFs) 602 and 604. Each DMF 602 and 604 includes four 32 symbol DMFs 614a-d (not shown for DMF 604). Each of DMF 602 and 604 implements a sliding correlation operation over four 32 symbol segments of a 128 symbol SYNC sequence. It will be appreciated that the 128 symbol SYNC sequence is used as an example. Other numbers of symbols may also be used.

Serial I signal is sent to DMF 602. Within DMF 602, the serial I signal, is delayed by delay lines 608a-d, corresponding to four symbol segments of the 128 symbol SYNC sequence. A sliding correlation is performed by correlation modules 612a-d, between respective delay lines 608a-d (including 0 delay) and 32 symbol sequence segments 610a-d. A similar process (not shown) is performed by DMF 604 for the serial Q signal.

The output signals from each 32 symbol DMF 614a-d of DMF 602 and the respective output signals of DMF 604 are combined by combiner 606. Combiner 606 may include summers and mixers for combining the output signals to produce fine SYNC and/or coarse SYNC, as described later below.

Figure 7:
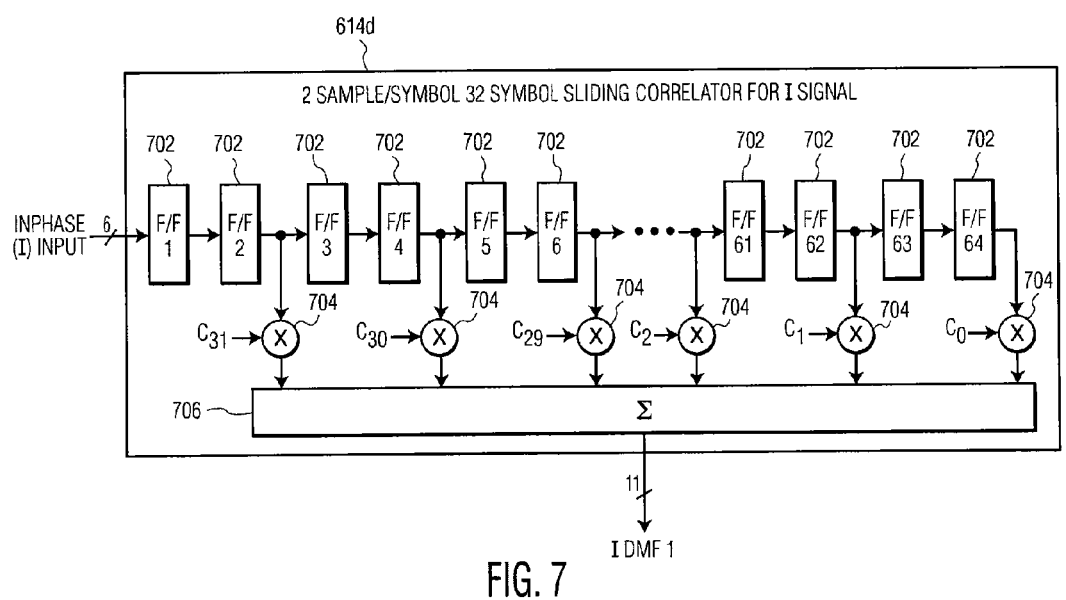
FIG. 7 is a block diagram of a 32 Symbol DMF structure, in accordance with an embodiment of the present invention.

The structure for each of the 32 symbol DMF 614a-d is the same. One 32 symbol DMF for correlating with sequence segments (for example) $c_0$ to $c_{31}$ is shown in FIG. 7. As shown, 32 symbol DMF 614d includes 64 flip-flops (F/F) 702. The serial I signal is serially delayed using the 64 F/Fs, which correspond to delay lines 608d (FIG. 6). Because the input serial I and Q signals are each sampled at twice the symbol rate, the output of every other F/F 702 is provided to mixers 704 for multiplying with respective SYNC sequence coefficients $c_0$ to $c_{31}$. The outputs from all 32 mixers 704 are summed by summer 706 to form the DMF output signal, I DMF 1, for example. Mixers 704 and summer 706 correspond to correlation module 612d (FIG. 6). Similar operations are performed with delay elements 608a-c, 610a-c, and 612a-c (FIG. 6) for the remaining input serial I signal components, and similar operations are performed with four 32 symbol DMFs (not shown) of DMF 604 for respective components of the input serial Q signal.

Figure 8:
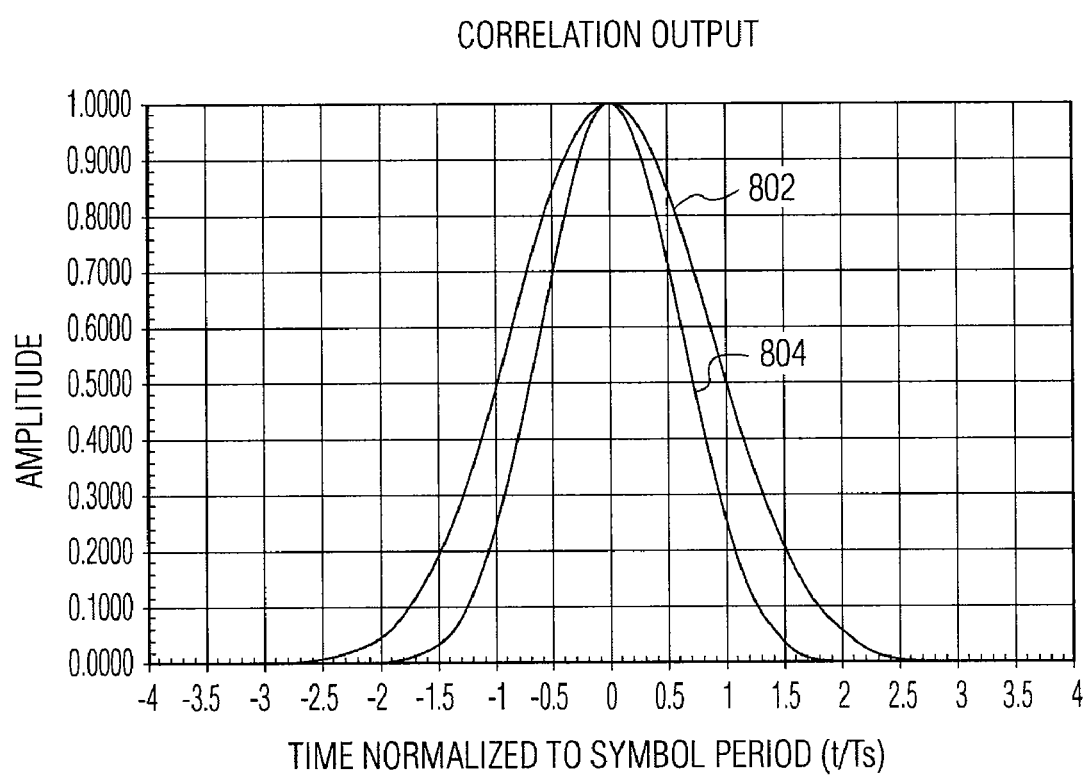
FIG. 8 are plots of QBL-MSK and squared QBL-MSK correlation curves for use with magnitude detector, according to an embodiment of the present invention.

The four 32 symbol DMF segments, shown in FIG. 6, minimize the correlation degradation introduced by the carrier frequency error ($\Delta f$). To minimize the correlation degradation to under 3 dB, the phase drift across the 32 symbol segments for the maximum frequency error is set at 45 degrees. The convolution operation of the I and Q output signals for each of the 32 symbol DMF 614a-d about the correlation peak, at n equal to zero is given by the following equations:

$$I_k(0.5\,nT_s) = 32 \cdot \left[\frac{\sin(32\pi\Delta f T_s)}{32 \cdot \sin(\pi\Delta f T_s)}\right] \cdot g(nT_s + \Delta T_s) \cdot \qquad (\text{eqn 24})$$
$$\cos\left(2\pi[32(k-1)]\Delta f T_s + 31\pi\Delta f T_s + \pi[n\Delta f T_s] + \frac{\pi n}{4} + \theta_c\right)$$

and $$Q_k(0.5\,nT_s) = -32 \cdot \left[\frac{\sin(32\pi\Delta f T_s)}{32 \cdot \sin(\pi\Delta f T_s)}\right] \cdot g(nT_s + \Delta T_s) \cdot \qquad (\text{eqn 25})$$
$$\sin\left(2\pi[32(k-1)]\Delta f T_s + 31\pi\Delta f T_s + \pi[n\Delta f T_s] + \frac{\pi n}{4} + \theta_c\right);$$

where k=1, 2, 3 and 4 represents the four 32 symbol DMF 614a-d outputs, n is the sample point about the peak QBL-MSK correlation function at n equal to zero, and the QBL-MSK correlation function represented by g( ) is non-zero when its argument is between the time interval of –3 Ts and 3 Ts, as shown in FIG. 8.

Because the four 32 symbol DMFs are in a serial configuration, the QBL-MSK correlation functions for each DMF 614a-d are time aligned. The amplitude term multiplying the QBL-MSK correlation function {g( )} is determined by the carrier frequency error, the number of symbol correlations in the DMF, and the symbol period.

The maximum carrier frequency error for this approach is set by the following equation:

$$M\pi\Delta f_{\max} T_s = \frac{\pi}{4}; \qquad (\text{eqn 26})$$

where M is the number of correlation samples, which is equal to 32 for the exemplary embodiment. This relationship minimizes the reduction in the amplitude by less than 3 dB.

It is desirable to reduce the number of symbols correlated in the DMF if the carrier frequency error is larger than the maximum carrier frequency error determined by this equation. For example, the DMF symbols can be reduced from 32 to 16, which increases the maximum carrier frequency error by a factor of 2.

By partitioning the 128 symbol SYNC sequence into small segments, the maximum carrier frequency error that the system may handle is increased. The cross-correlation properties of the SYNC sequence increases, however, which increases the probability of a false SYNC detection.

From equations 24 and 25, the time varying phase argument of the cosine and sine term is:

$$\theta_k(0.5\,nT_s) = 2\pi[32\,k]\Delta f T_s + \pi[n\Delta f T_s] + \frac{\pi n}{4} + \theta_c - 33\pi\Delta f T_s; \qquad (\text{eqn 27})$$

where k=1, 2, 3, and 4 represents the four 32 symbol DMF outputs and n is the sample point about the peak QBL-MSK correlation function at n equal to zero.

The phase term that changes for each DMF output is:

$$\Delta\theta_k(0.5nT_s) = \pi[32k]\Delta f T_s. \qquad (\text{eqn 28})$$

This phase term results in a $2\pi[32]\Delta f T_s$ phase advance for each consecutive DMF 614a-d output, which can result in significant degradation in the I and Q correlation signal if the four 32 symbol DMF outputs are added together in combiner 606 to form a 128 symbol I and Q DMF.

To prevent this degradation due to changing phase, the magnitudes or squared magnitudes of the four 32 symbol I and Q DMF pairs may be added together, which removes the phase term. FIG. 8 shows the output signal for the two different correlation outputs, QBL-MSK autocorrelation function 802 and squared QBL-MSK autocorrelation function 804.

The squared magnitude approach results in a SYNC correlation response equal to the squared QBL-MSK correlation function, while the magnitude approach produces the QBL-MSK correlation function. The correlation response for the squared QBL-MSK autocorrelation function is sharper than the QBL-MSK autocorrelation function, as expected.

Either output may be used for correlation strength estimation, but typically the magnitude is used because it can be implemented using the following algorithm:

$$S_k(0.5\,nT_s) = \qquad\qquad\qquad\qquad\qquad\qquad\text{(eqn 29)}$$
$$\text{Max}\{MAG[I\ DMF_k(0.5\,nT_s)], MAG[Q\ DMF_k(0.5\,nT_s)]\} +$$
$$\frac{1}{2}\cdot\text{Min}\{MAG[I\ DMF_k(0.5\,nT_s)], MAG[Q\ DMF_k(0.5\,nT_s)]\},$$
$$\text{for } k = 1, 2, 3, \&\, 4;$$

where Max{ } is the maximum value of its two arguments, Min{ } is the minimum value of its two arguments, and Mag[ ] is the magnitude of its argument.

Figure 9:
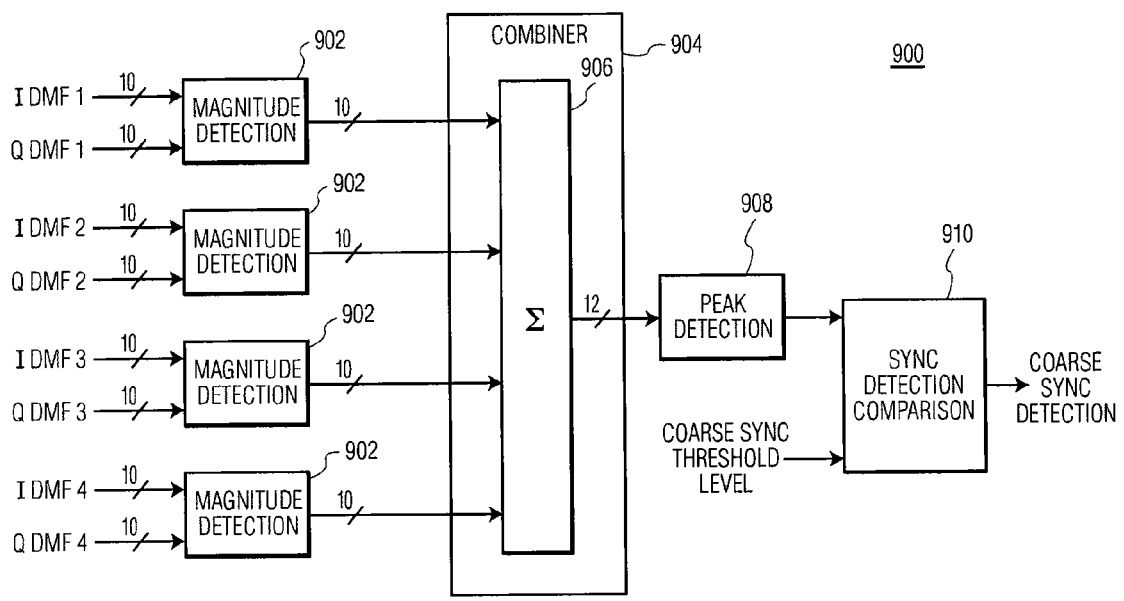
FIG. 9 is a block diagram of a coarse SYNC structure, in accordance with an embodiment of the present invention.

FIG. 9 shows coarse SYNC module 900, within combiner 606 (FIG. 6), which uses a magnitude combining process. This approach may be referred to as coarse SYNC, because its SYNC detection performance may be reduced from a desired single 128 symbol DMF performance without carrier frequency error. A single 128 symbol DMF structure coherently combines all 128 symbols, while the four 32 symbol DMF 614a-d coherently combines 32 symbols and noncoherently combines the four DMF outputs of 614a-d in combiner 606 (FIG. 6).

As shown in FIG. 9, the four 32 symbol I and Q DMF output pairs for each respective 32 symbol sector are provided to respective magnitude detectors 902. The output signals are then combined in combiner 904 by summer 906, thus removing the phase term. Peak detector 908 detects the peak of the output signal of combiner 904. Comparator 910 compares the output of peak detector 908 against a coarse SYNC threshold level. If the detected peak is higher than the coarse SYNC threshold level, coarse SYNC is declared.

Noncoherent combining results in a reduction in SYNC performance using four 32 symbol DMFs 614a-d versus using a single 128 symbol DMF. To achieve the same probability of SYNC detection with four 32 symbol DMF 614a-d as with a single 128 symbol DMF, the SYNC threshold is reduced. This, however, results in a higher false SYNC and false alarm rate. Consequently, a fine SYNC module, such as module 1000 (FIG. 10) is included in an embodiment of the present invention. The combination of coarse SYNC module 900 and fine SYNC module 1000 (FIG. 10) significantly reduces false SYNC and the false alarm rate.

Figure 10:
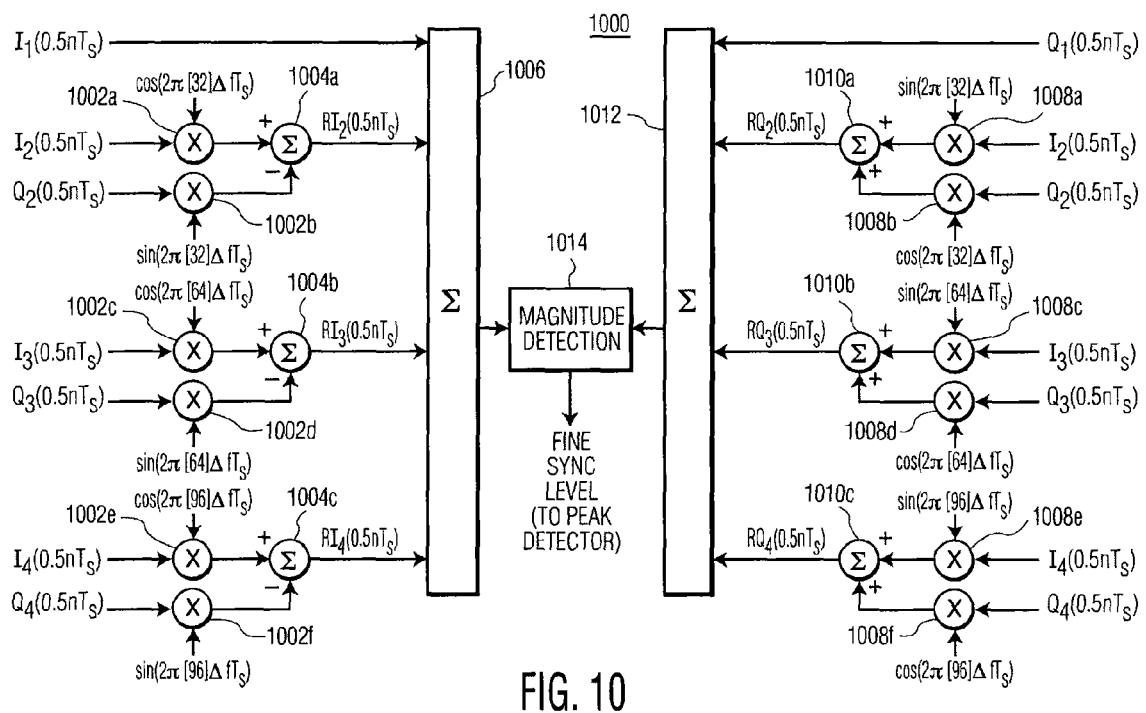
FIG. 10 is a block diagram of a fine SYNC structure, with frequency removal in accordance with an embodiment of the present invention.

FIG. 10 shows a block diagram of fine SYNC module 1000 within combiner 606 (FIG. 6). Fine SYNC module 1000 effectively removes the phase error on each 32 symbol correlator introduced by a carrier frequency error, assuming the carrier frequency error can be determined. Estimation of the carrier frequency error may be achieved by using coarse SYNC module 900 to establish an initial SYNC, followed by processing the stored received initial SYNC signal against the SYNC reference sequence to estimate the carrier frequency error.

As shown in FIG. 10, the four 32 symbol I and Q DMF output pairs for each respective 32 symbol segment are provided to respective mixers 1002a-f and 1008a-f for mixing with the estimated carrier frequency error. The output of mixers 1002a-f and 1008a-f are summed with respective summers 1004a-c and 1010a-c. The output of summers 1004a-c (phase rotated $RI_2$, $RI_3$ and $RI_4$), and 1010a-c (phase rotated $RQ_2$, $RQ_3$ and $RQ_4$), as well as $I_1$ and $Q_1$ (each having no phase rotation), are provided to respective summers 1006 and 1012. The output of summers 1006 and 1012 are provided to magnitude detector 1014 to select the largest output as the fine SYNC level.

By using the estimated carrier frequency errors, the fine SYNC level is determined using fine SYNC module 1000. If the fine SYNC level output from magnitude detector 1014 exceeds a fine SYNC threshold, fine SYNC is declared and data demodulation can begin. If the fine SYNC level is not exceeded, fine SYNC is examined for the next coarse SYNC time.

For lower symbol rates, a high speed clock (not shown) in fine SYNC module 1000 can reduce the SYNC latency and the memory requirements. For high symbol rates or spread systems with high chip rates, memory requirements may grow significantly. Also, low receiver sensitivities receiving spreading codes with high processing gain, typically, operate at higher noise levels, introducing degradation in the carrier frequency estimation.

Figure 11:
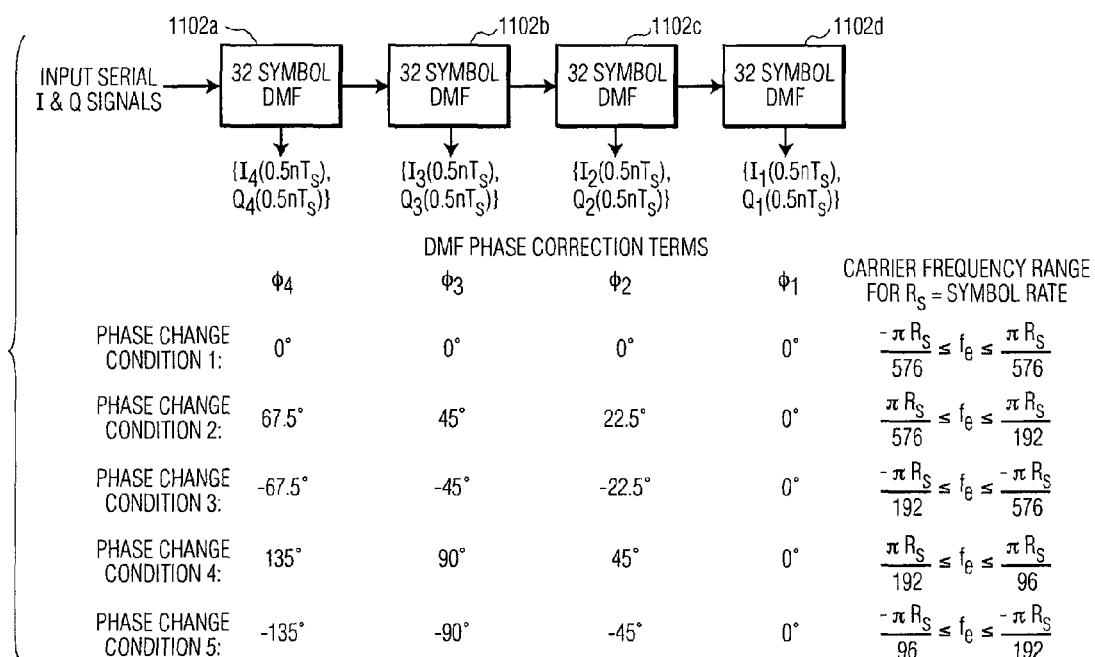
FIG. 11 is a block diagram of a DMF phase correction structure and phase conditions for use with fine SYNC structure of FIG. 12, in accordance with an embodiment of the present invention.

To significantly improve SYNC latency and reduce fine SYNC complexity, the present invention implements a fine SYNC process that is separated into five different carrier frequency error ranges. FIG. 11 shows 5 different phase change conditions along with a carrier frequency error range each condition is enabled to handle. FIG. 11 also shows the 32 symbol DMFs 1102a-d outputs (separate I's and is Q's) determined from input serial I and Q signals. As shown in FIG. 11, to handle positive and negative carrier frequency errors about a carrier frequency error of zero, two phase conditions which are opposite in phase values are used (conditions 2 and 3 and conditions 4 and 5).

Figure 12:
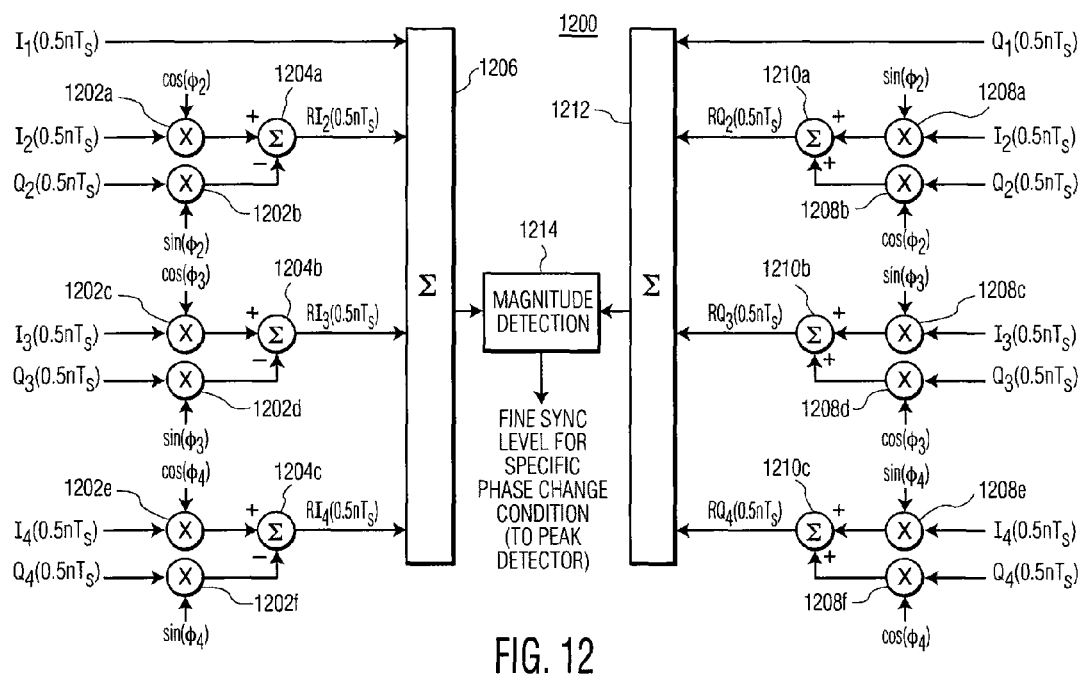
FIG. 12 is a block diagram of an alternate fine SYNC structure for a phase change condition, in accordance with an embodiment of the present invention.

FIG. 12 shows a block diagram of an embodiment of the fine SYNC module, designated as 1200. Implementation of each of the five phase conditions may be achieved by providing the phase terms ($\phi_1$, $\phi_2$, $\phi_3$ and $\phi_4$) as shown in FIG. 12. The structure of fine SYNC module 1200 is the same as fine SYNC module 1000 (FIG. 10) except that SYNC module 1200 does not use the carrier frequency error ($\Delta f$) to generate the phase terms, but uses the phase terms of FIG. 11.

Referring to FIG. 12, mixers 1202a-f and 1208a-f are the same as mixers 1002a-f and 1008a-f, except that mixers 1202a-f and 1208a-f are mixed using phase terms $\phi_1$, $\phi_2$, $\phi_3$, and $\phi_4$. Since $\phi_1=0$, no mixers are required to implement this phase condition. Summers 1204a-c and 1210a-c are the same as summers 1004a-c and 1010a-c, except that the output of summers 1204a-c and 1210a-c are based on the phase terms rather than the estimated carrier frequency errors of FIG. 10. The output of summers 1204a-c (rotated $RI_2$, $RI_3$ and $RI_4$) and 1210a-c (rotated $RQ_2$, $RQ_3$ and $RQ_4$) as well as non-rotated $I_1$ and $Q_1$, are provided to respective summers 1206 and 1212. The output of summers 1206 and 1212 are provided to magnitude detector 1214 to determine a fine SYNC level.

Because five phase change conditions exist (FIG. 11), five frequency removal processes are implemented, each with proper phase terms $\phi_1$, $\phi_2$, $\phi_3$, and $\phi_4$. Because the phase term $\phi_1$ is equal to zero for all phase change conditions (see FIG. 11), no correction operation is performed on the $I_1$ and $Q_1$ DMF outputs (FIG. 11).

Figure 13:
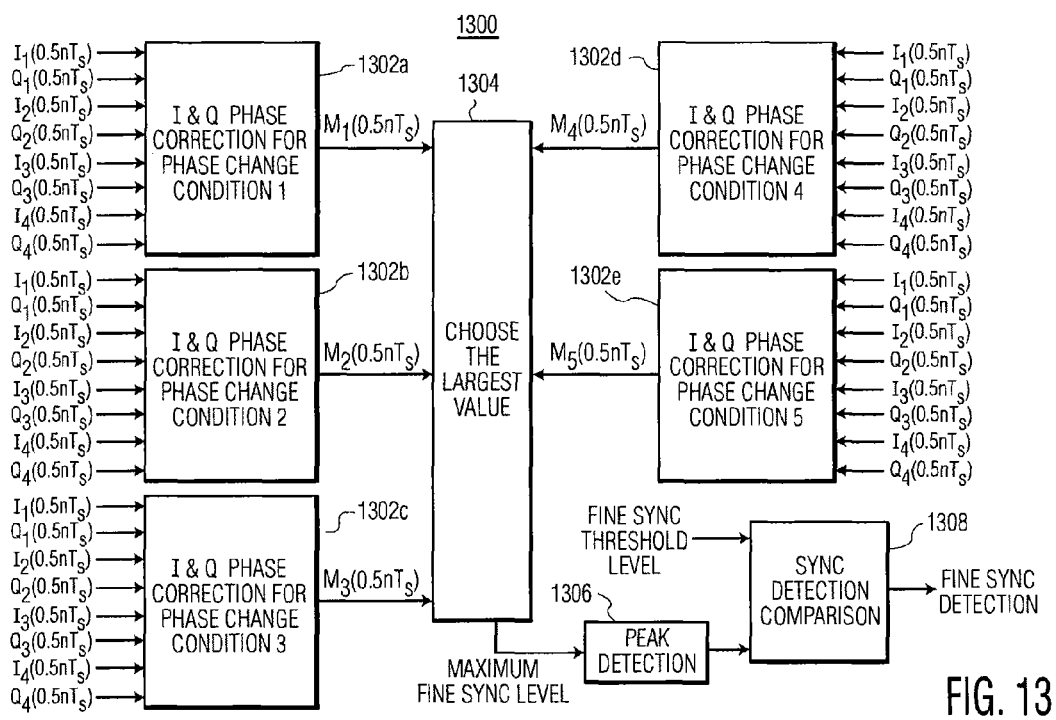
FIG. 13 is a block diagram of a fine SYNC level structure, in accordance with an embodiment of the present invention.

FIG. 13 shows a top level block diagram of another embodiment of a fine SYNC level module, generally designated as 1300, used to obtain a maximum fine SYNC level. The fine SYNC levels determined for each phase change condition (FIG. 11) using phase change modules 1302*a-e* are compared in comparator 1304 to select the maximum level as the fine SYNC output level. Peak detection of the maximum fine SYNC output level is performed by peak detector 1306 by comparing the present sample with a previous and a future sample. The fine SYNC peak level is then compared against a fine SYNC threshold by comparator 1308 to detect the fine SYNC. If the fine SYNC threshold is exceeded, then fine SYNC detection is declared.

In an alternative embodiment, selecting the maximum fine SYNC level for the five different phase conditions (FIG. 11) may be performed by following each of the fine SYNC level outputs for the five different phase conditions from modules (1302*a-e*) with an independent peak detector and then selecting the maximum peak level. This selected maximum peak level may next be compared to a SYNC threshold level to determine if fine SYNC has occurred, using the same SYNC detection comparator 1308 shown in FIG. 13.

For fine SYNC module 1200 which performs carrier frequency error removal using the 5 phase change conditions (FIG. 11), estimation of the carrier frequency error is not used. Coarse SYNC module 900 is, thus, not used to establish initial SYNC for carrier frequency estimation, when using fine SYNC module 1200. Coarse SYNC module 900 may be used to complement fine SYNC module 1200 only when a coarse SYNC is detected. This approach reduces the power consumption, because the fine SYNC process is more complicated.

Figure 14:
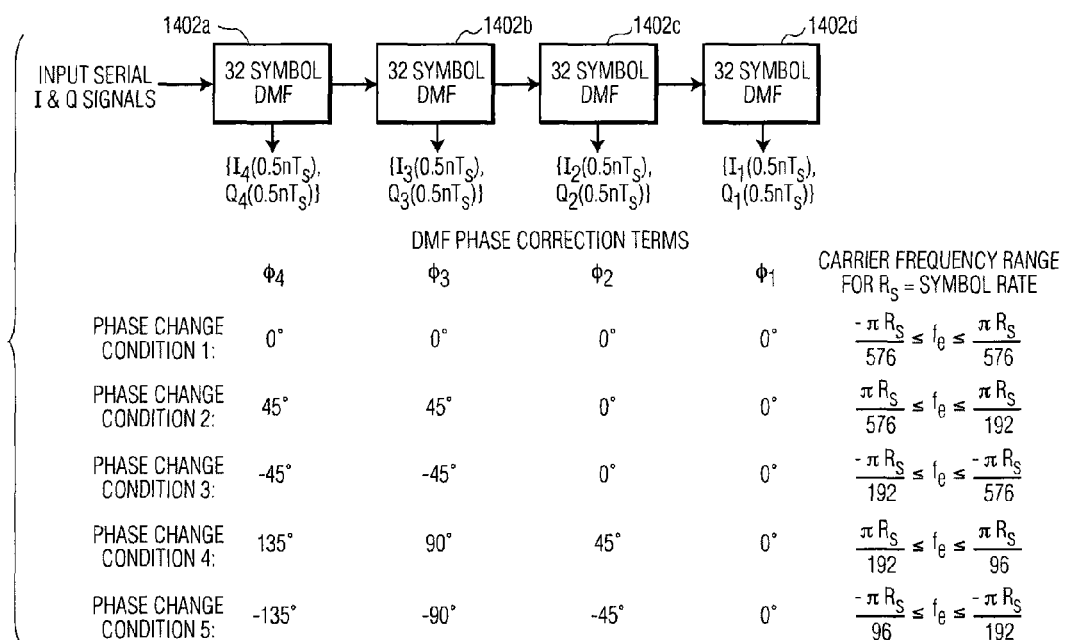
FIG. 14 is a block diagram of an alternate DMF phase correction structure and phase conditions, in accordance with the present invention.
Figure 15A:
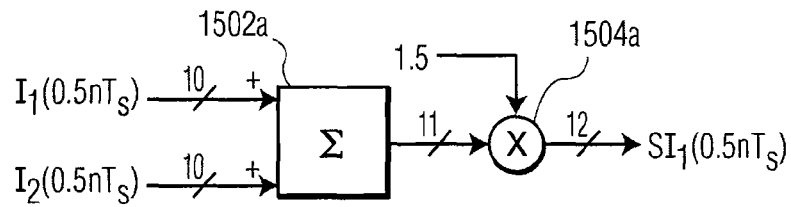
FIG. 15A is a block diagram illustrating a first section of a DMF phase correction structure for use with alternate DMF phase correction structure and phase conditions of FIG. 14.
Figure 15B:
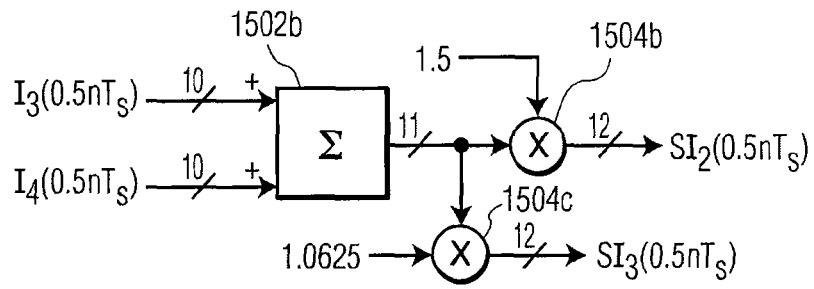
FIG. 15B is a block diagram illustrating a second section of a DMF phase correction structure for use with the alternate DMF phase correction structure and phase conditions of FIG. 14.
Figure 15C:
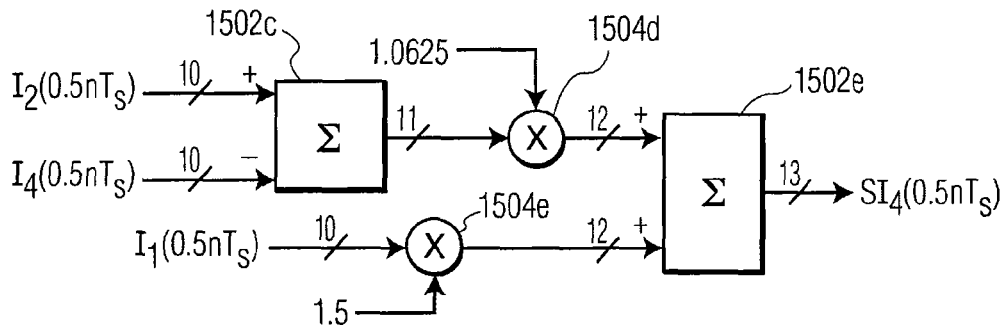
FIG. 15C is a block diagram illustrating a third section of a DMF phase correction structure for use with alternate DMF phase correction structure and phase conditions of FIG. 14.
Figure 15D:
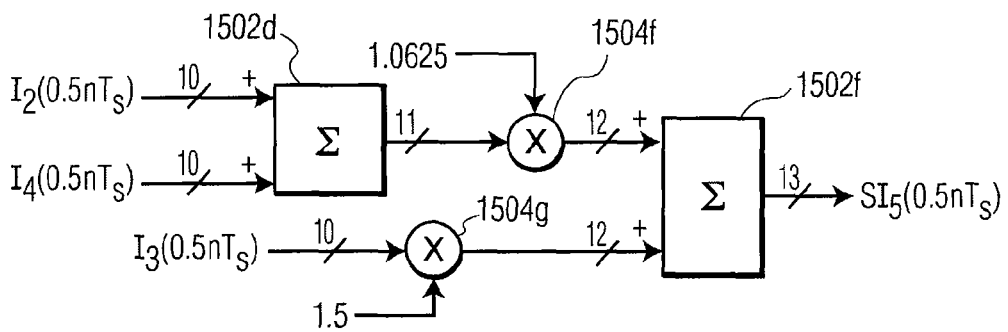
FIG. 15D is a block diagram illustrating a fourth section of a DMF phase correction structure for use with alternate DMF phase correction structure and phase conditions of FIG. 14.
Figure 15E:
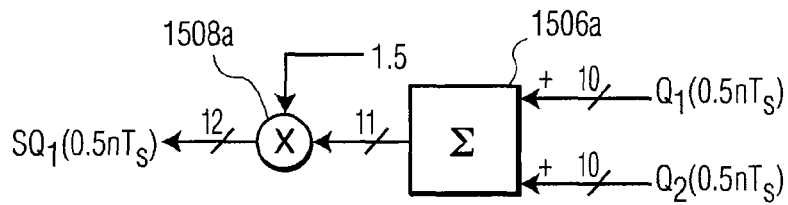
FIG. 15E is a block diagram illustrating a fifth section of a DMF phase correction structure for use with alternate DMF phase correction structure and phase conditions of FIG. 14.
Figure 15F:
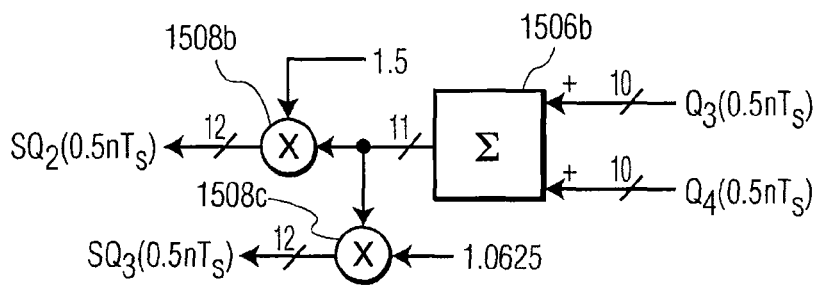
FIG. 15F is a block diagram illustrating a sixth section of a DMF phase correction structure for use with alternate DMF phase correction structure and phase conditions of FIG. 14.
Figure 15G:
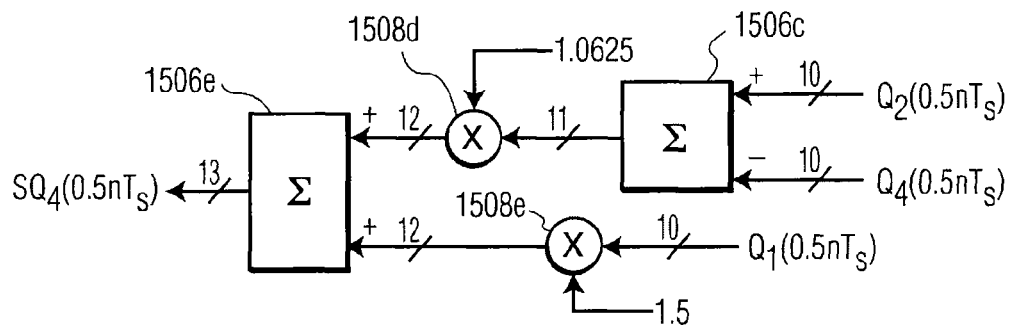
FIG. 15G is a block diagram illustrating a seventh section of a DMF phase correction structure for use with alternate DMF phase correction structure and phase conditions of FIG. 14.
Figure 15H:
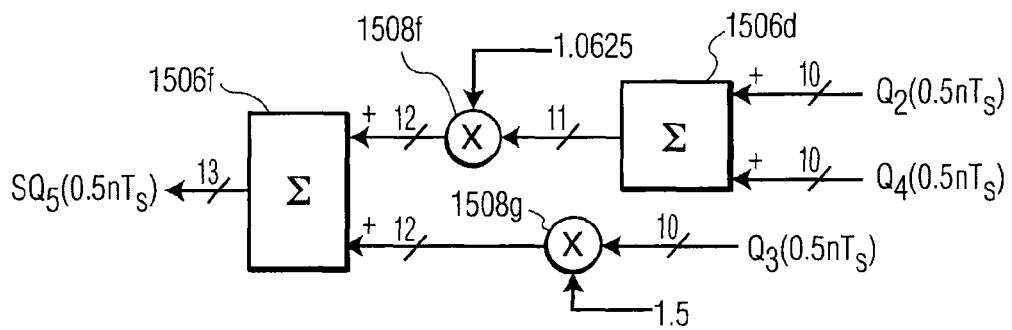
FIG. 15H is a block diagram illustrating a eighth section of a DMF phase correction structure for use with alternate DMF phase correction structure and phase conditions of FIG. 14.

For high symbol rates or direct spread systems with high chip rates, the frequency removal process for each phase change condition may be simplified using two steps. Step one simplifies the phase changes used for the phase change conditions 2 and 3 shown in FIG. 11. FIG. 14 shows these simplified phase changes for conditions 2 and 3. FIG. 14 also shows four 32 symbol DMF 1402*a-d* using the input serial I and Q signals. By making these changes to change conditions 2 and 3, the number of phases used by the frequency removal process may be reduced.

Step two simplifies the multiplication operation complexity in the frequency error removal process by applying the following amplitude scaling and approximations:

$$0° \Rightarrow 1.5 \cdot [\cos(0) + j\sin(0)] = 1.5, \quad \text{(eqn 30)}$$

$$\pm 45° \Rightarrow 1.5 \cdot [\cos(\tfrac{\pi}{4}) \pm j\sin(\tfrac{\pi}{4})] = \quad \text{(eqn 31)}$$
$$1.06066 \cdot [1 \pm j] \approx \left[1 + \tfrac{1}{16}\right] \cdot [1 \pm j] = 1.0625 \cdot [1 \pm j],$$

$$\pm 90° \Rightarrow 1.5 \cdot [\cos(\tfrac{\pi}{2}) \pm j\sin(\tfrac{\pi}{2})] = 1.5 \cdot [\pm j], \quad \text{(eqn 32)}$$

and $$\pm 135° \Rightarrow 1.5 \cdot [-\cos(\tfrac{\pi}{4}) \pm j\sin(\tfrac{\pi}{4})] = \quad \text{(eqn 33)}$$
$$1.06066 \cdot [-1 \pm j] \approx \left[1 + \tfrac{1}{16}\right] \cdot [-1 \pm j] = 1.0625 \cdot [-1 \pm j].$$

These equations show that all multiplication operations may be achieved by performing only one logic shift and add operation on the I side and Q side. This simplification significantly reduces the complexity and power consumption of the multiplier operations used in the frequency error removal process.

The magnitude level outputs ($M_1$-$M_5$ in FIG. 13) for the 5 different phase change conditions of phase change modules 1302*a-e* may be given by the following equations:

$$M_1(0.5\,nT_s) = Mag\left\{1.5 \cdot \sum_{k=1}^{4} I_k(0.5\,nT_s),\ 1.5 \cdot \sum_{k=1}^{4} Q_k(0.5\,nT_s)\right\}, \quad \text{(eqn 34)}$$

$$M_2(0.5\,nT_s) = Mag\left\{1.5 \cdot \sum_{k=1}^{2} I_k(0.5\,nT_s) + 1.0625 \cdot \right.$$
$$\sum_{k=3}^{4} [I_k(0.5\,nT_s) - Q_k(0.5\,nT_s)],\ 1.5 \cdot \sum_{k=1}^{2} Q_k(0.5\,nT_s) +$$
$$\left. 1.0625 \cdot \sum_{k=3}^{4} [Q_k(0.5\,nT_s) + I_k(0.5\,nT_s)]\right\}, \quad \text{(eqn 35)}$$

$$M_3(0.5\,nT_s) = Mag\left\{1.5 \cdot \sum_{k=1}^{2} I_k(0.5\,nT_s) + 1.0625 \cdot \right.$$
$$\sum_{k=3}^{4} [I_k(0.5\,nT_s) + Q_k(0.5\,nT_s)],\ 1.5 \cdot \sum_{k=1}^{2} Q_k(0.5\,nT_s) +$$
$$\left. 1.0625 \cdot \sum_{k=3}^{4} [Q_k(0.5\,nT_s) - I_k(0.5\,nT_s) +]\right\}, \quad \text{(eqn 36)}$$

$$M_4(0.5\,nT_s) = \quad \text{(eqn 37)}$$
$$Mag\{1.5 \cdot I_1(0.5\,nT_s) + 1.0625 \cdot [I_2(0.5\,nT_s) - Q_2(0.5\,nT_s)] -$$
$$1.5 \cdot Q_3(0.5\,nT_s) - 1.0625 \cdot [I_4(0.5\,nT_s) + Q_4(0.5\,nT_s)],$$
$$1.5 \cdot Q_1(0.5\,nT_s) + 1.0625 \cdot [I_2(0.5\,nT_s) + Q_2(0.5\,nT_s)] +$$
$$1.5 \cdot I_3(0.5\,nT_s) + 1.0625 \cdot [I_4(0.5\,nT_s) - Q_4(0.5\,nT_s)]\},$$

and $$M_5(0.5\,nT_s) = \quad \text{(eqn 38)}$$
$$Mag\{1.5 \cdot I_1(0.5\,nT_s) + 1.0625 \cdot [I_2(0.5\,nT_s) + Q_2(0.5\,nT_s)] +$$
$$1.5 \cdot Q_3(0.5\,nT_s) - 1.0625 \cdot [I_4(0.5\,nT_s) - Q_4(0.5\,nT_s)],$$
$$1.5 \cdot Q_1(0.5\,nT_s) - 1.0625 \cdot [I_2(0.5\,nT_s) - Q_2(0.5\,nT_s)] -$$
$$1.5 \cdot I_3(0.5\,nT_s) - 1.0625 \cdot [I_4(0.5\,nT_s) + Q_4(0.5\,nT_s)]\}.$$

Figure 16:
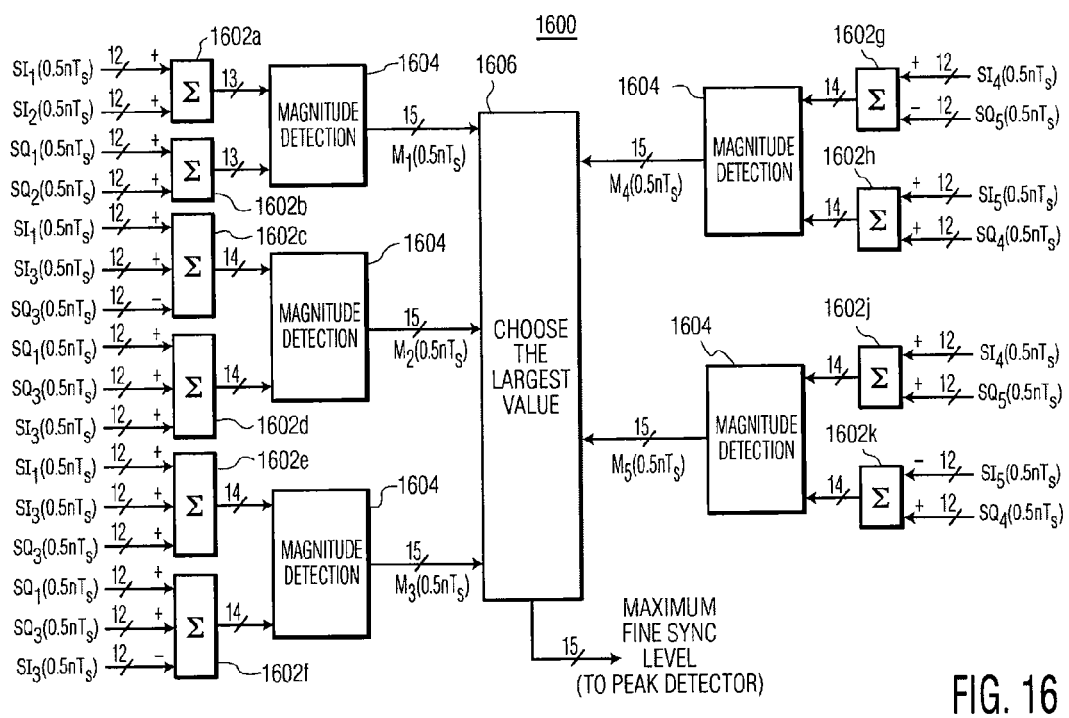
FIG. 16 is a block diagram illustrating a fine SYNC level structure for use with the alternate DMF phase correction structure of FIG. 14 and DMF phase correction structures of FIGS. 15A-H.

FIGS. 15A-15H and FIG. 16 show examples of how these equations (eqns. 34-38) may be implemented. FIGS. 15A-15H show the addition of common terms of the five different phase change conditions. FIG. 16 shows how these common terms may be added together to obtain the five different phase change conditions ($M_1$-$M_5$ in FIG. 14).

FIGS. 15A-15H show that four pairs of 32 symbol I DMF outputs and four pairs of 32 symbol Q DMF outputs for each respective 32 symbol segment are provided to summers 1502*a-d* and 1506*a-d* for summing between the respective pairs. The outputs of summers 1502*a-d* and 1506*a-d* are mixed using respective mixers 1504*a-g* and 1508*a-g*. In FIGS. 15C, 15D, 15G and 15H, outputs from mixers 1504*d-e*, 1504*f-g*, 1508*d-e* and 1508*f-g* are further provided to respective summers 1502*e-f* and 1506*e-f*.

FIG. 16 shows a top level block diagram of fine SYNC level module 1600 used to obtain a fine SYNC level based on the phase output signals shown in FIGS. 15A-15H. A maximum fine SYNC level is obtained by selecting the maximum level out of the five phase change conditions using selector 1606. The five phase change conditions are determined by summing the output signals shown in FIGS. 15A-15H using respective summers 1602*a-h* and 1602*j-k* and detecting magnitudes using respective magnitude detectors 1604 which receive the output signals of summers 1602*a-h* and 1602*j-k*. The maximum fine SYNC level selected by selector 1606 is sent to a peak detector (such as peak detector 1306 shown in FIG. 13).

In an alternative embodiment, a peak detector may be placed after each of the five different phase change conditions outputted by each magnitude detector 1604, to select the maximum peak level for the fine SYNC peak level. Because this implementation does not need coarse SYNC module 900, fine SYNC level module 1600 may be implemented with or without coarse SYNC module 900.

In summary, the present invention performs a rapid synchronization (SYNC) technique with a fast carrier frequency error correction to provide fine SYNC detection for improvement in receiver sensitivity. Serial formatting of the modulation waveform is desirably selected to reduce the SYNC correlation complexity. The method of the present invention uses fine and/or coarse SYNC detection which may be applied to other types of demodulator architectures, such as a demodulator using four correlators, by making the appropriate changes to the correlation structure.

Although the method of the present invention describes QBL-MSK, the method may be applied to other offset quadrature modulation and continuous phase modulated (CPM) waveforms. Serial formatting of these waveforms is desired to simplify the improved SYNC detection process.

The method of the present invention may be applied to binary phase shift keying (BPSK) or filtered BPSK, where serial formatting is typically not used to provide the reduced SYNC and frequency estimation correlation structure.

For other similar and non-similar disclosures, please refer to the following five applications filed on the same day as this application. These five applications are TBD (and, respectively, correspond to the following five provisional applications 60/703,316; 60/703,180; 60/703,179; 60/703,373 and 60/703,095). These applications are all incorporated herein by reference in their entireties.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for synchronization (SYNC) detection of a received serial offset quadrature pulse shaped waveform modulated by a predetermined SYNC sequence of symbols, the method comprising the steps of:
   a) serially demodulating the received waveform into a serial baseband signal having the same predetermined SYNC sequence of symbols;
   b) correlating the serial baseband signal with a plurality of segments of the SYNC sequence of symbols to form a plurality of serially correlated output signals, the plurality of segments forming the predetermined SYNC sequence of symbols;
   c) phase correcting the serially correlated output signals based upon predetermined phase change conditions; and
   d) detecting SYNC using the phase corrected serially correlated output signals.

2. The method according to claim 1, further including the steps of:
   e) selecting one of the phase corrected serially correlated output signals of step (c) having a maximum value;
   f) determining a peak in the selected phase corrected signal; and
   g) comparing the peak of step (f) with a SYNC threshold level to detect SYNC.

3. The method according to claim 1, wherein a fine SYNC is detected.

4. The method according to claim 1, wherein a number of segments includes at least four segments.

5. The method according to claim 1, wherein the received serial offset quadrature pulse shaped waveform includes one of minimum shift keying (MSK), Gaussian MSK, serial quasi-bandlimited-MSK (SQBL-MSK), binary phase shift keying (BPSK), filtered BPSK, offset quadrature PSK (OQPSK), intersymbol jitter free OQPSK (IJF-OQPSK), raised cosine filtered OQPSK (RC-OQPSK), continuous phase modulation (CPM), or tamed frequency modulation (TFM).

6. The method according to claim 1, wherein the received waveform has a symbol rate and step (a) includes:
   demodulating the received waveform with a carrier frequency signal to form a baseband signal; and
   sampling the baseband signal at a rate of twice the symbol rate.

7. The method according to claim 1, wherein step (a) includes forming in-phase (I) and quadrature (Q) baseband signals.

8. The method according to claim 1, wherein the received waveform has a symbol rate and step (a) includes:
   demodulating the received waveform to form in-phase (I) and quadrature (Q) baseband signals, each of the I and Q baseband signals sampled at a rate of twice the symbol rate; and
   phase-rotating each of the I and Q baseband signals to form serially demodulated I and Q baseband signals, each of the serial I and Q baseband signals having the same predetermined SYNC sequence of symbols.

9. The method according to claim 1, wherein step (b) includes:
   serially delaying the serial baseband signal to correspond to at least a first set of symbols of one segment of the SYNC sequence and a second set of symbols of another segment of the SYNC sequence; and
   concurrently correlating the first set of symbols and the second set of symbols with the serially delayed serial baseband signal, respectively, to form the serially correlated output signals.

10. The method according to claim 1, wherein the received waveform has a carrier frequency and step (c) includes:
    estimating a carrier frequency error; and
    phase correcting the serially correlated output signals based on the estimated carrier frequency error.

11. The method according to claim 10, wherein step (d) includes:
    selecting a large magnitude of the phase corrected serially correlated output signals to form a SYNC level; and
    comparing the SYNC level with a SYNC threshold level to detect SYNC.

12. The method according to claim 1, wherein the received waveform has a symbol rate and the predetermined phase change conditions are based on respective predetermined ranges of carrier frequency errors relative to the symbol rate.

13. The method according to claim 12, wherein each of the predetermined phase change conditions includes a set of predetermined phase correction terms associated with the serially correlated output signals.

14. The method according to claim 13, wherein a number of predetermined ranges of the carrier frequency errors includes five ranges and each set of the predetermined phase correction terms includes four predetermined phase correction terms.

15. The method according to claim 13, wherein step (c) includes:

phase correcting the serially correlated output signals based on the set of predetermined phase change correction terms associated with one of the predetermined phase change conditions; and selecting a large magnitude of the phase corrected serially correlated output signals to form one of the plurality of phase corrected signals associated with the one of the predetermined phase change conditions.

16. A receiver comprising:

a demodulator for serially demodulating a received waveform into a serial baseband signal, the serial baseband signal having a predetermined synchronization (SYNC) sequence of symbols;

a matched filter for correlating the serial baseband signal with a plurality of segments of the SYNC sequence of symbols to form a plurality of serially correlated output signals, the plurality of segments forming the predetermined SYNC sequence of symbols;

a phase corrector for phase correcting the serially correlated output signals based upon predetermined phase change conditions; and a detector for detecting a fine SYNC from the plurality of phase corrected serially correlated output signals.

17. The receiver according to claim 16, including:

a correlation strength estimator for computing correlation strength estimates of each of the serially correlated output signals;

a combiner for combining the correlation strength estimates to form a combined correlation signal; and a peak detector for determining a peak in the combined correlation signal.

18. The receiver according to claim 17, further including:

a comparator for comparing the peak in the combined correlation signal with a SYNC threshold level to detect a coarse SYNC when the peak is greater than the SYNC threshold level.

19. The receiver according to claim 16, wherein the detector includes:

a selector for selecting one of the phase corrected serially correlated output signals having a maximum value;

a peak detector for detecting a peak in the selected phase corrected serially correlated output signal; and a comparator for comparing the peak in the selected phase corrected serially correlated output signal with a SYNC threshold level to detect the fine SYNC when the peak is greater than the SYNC threshold level.

20. The receiver according to claim 16, wherein the received serial offset quadrature pulse shaped waveform includes one of minimum shift keying (MSK), Gaussian MSK, serial quasi-bandlimited-MSK (SQBL-MSK), binary phase shift keying (BPSK), filtered BPSK, offset quadrature PSK (OQPSK), intersymbol jitter free OQPSK (IJF-OQPSK), raised cosine filtered OQPSK (RC-OQPSK), continuous phase modulation (CPM), or tamed frequency modulation (TFM).

\* \* \* \* \*